United States Patent [19]

Trzyna et al.

[11] Patent Number: 5,414,475
[45] Date of Patent: May 9, 1995

[54] METHOD OF OPERATING A LOW STANDBY POWER SYSTEM FOR A TELEVISION RECEIVER

[75] Inventors: William A. Trzyna, Elgin; Carl E. Walding, Barrington, both of Ill.

[73] Assignee: Zenith Electronics Corp., Glenview, Ill.

[21] Appl. No.: 105,231

[22] Filed: Aug. 11, 1993

[51] Int. Cl.$^6$ ............................................. H04N 5/63
[52] U.S. Cl. ...................... 348/730; 307/64; 365/229
[58] Field of Search ................ 348/730; H04N 5/63; 455/343; 365/227, 229; 307/64, 66; 361/90

[56] References Cited

U.S. PATENT DOCUMENTS

| | | | |
|---|---|---|---|
| 3,766,403 | 10/1973 | Tsutsumi | 307/66 |
| 4,005,344 | 1/1977 | Gaind et al. | 361/92 |
| 4,385,264 | 5/1983 | Balaban et al. | 348/730 |
| 4,866,525 | 4/1989 | Rodriguez-Cavazos et al. | 348/730 |
| 4,885,522 | 12/1989 | Konopka | 320/21 |
| 5,175,441 | 12/1992 | den Hollander | 348/730 |
| 5,272,382 | 12/1993 | Heald et al. | 307/66 |

Primary Examiner—James J. Groody
Assistant Examiner—Jeffrey S. Murrell

[57] ABSTRACT

A television receiver includes a microprocessor, a switched mode power supply and a storage capacitor. The storage capacitor supplies standby power to the microprocessor when the television receiver is off and the switched mode power supply is disabled. While the television receiver is off, the microprocessor monitors the capacitor voltage and turns on the switched mode power supply to recharge the capacitor when its voltage level falls to a predetermined minimum. The microprocessor turns off the switched mode power supply when the capacitor voltage indicates that the capacitor has been recharged.

6 Claims, 1 Drawing Sheet

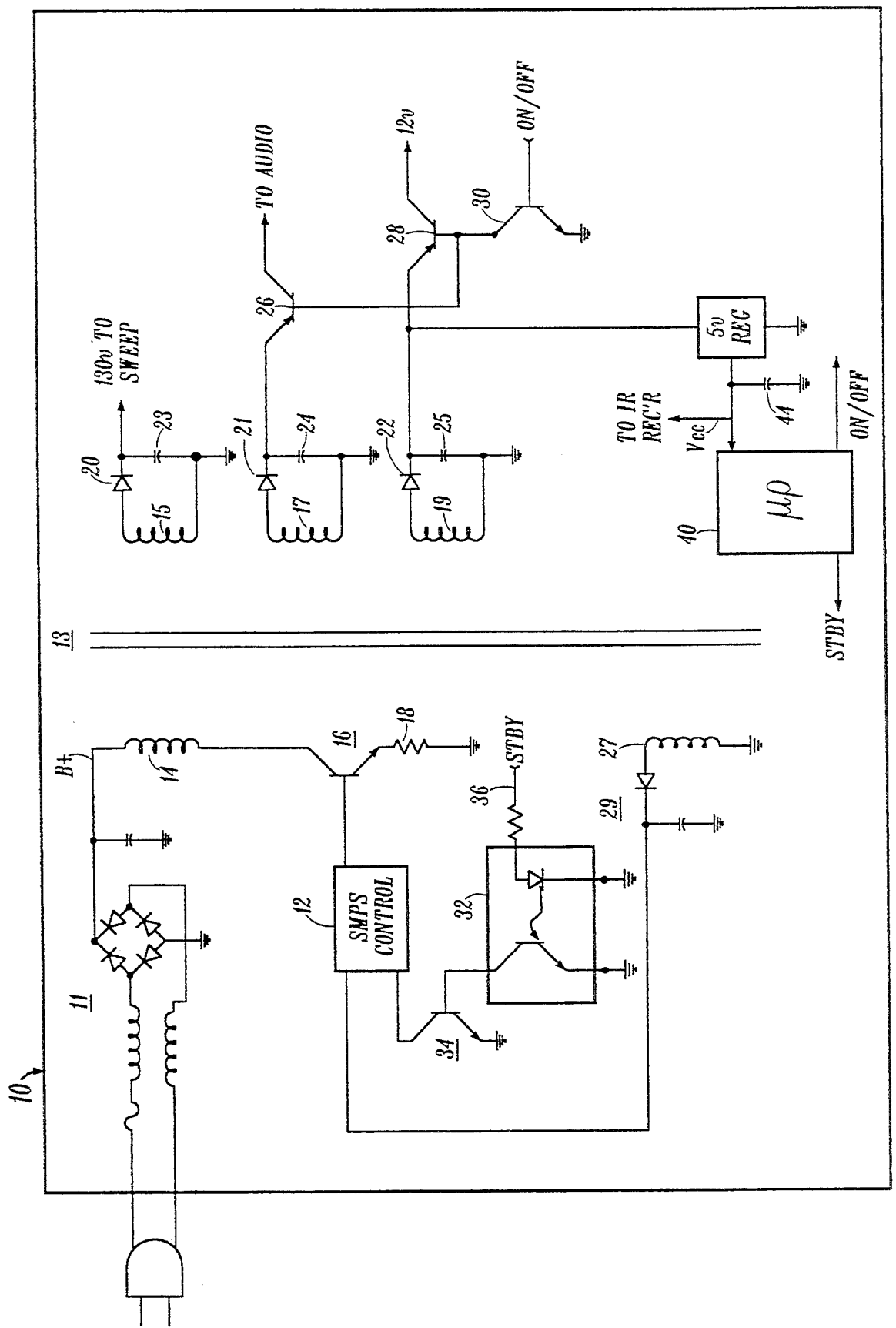

METHOD OF OPERATING A LOW STANDBY POWER SYSTEM FOR A TELEVISION RECEIVER

BACKGROUND OF THE INVENTION AND PRIOR ART

This invention relates in general to television receiver power supplies and in particular to an efficient power supply for a television receiver that requires a small amount of standby power when in the off condition.

Modern television receivers are both microprocessor controlled and remotely controllable and require a low level of standby power when the television receiver is off to maintain the microprocessor and remote control functions. Such receivers generally include a very efficient switched mode power supply which has the undesirable characteristic of being inefficient when supplying low levels of power. The standby power requirement of a typical television receiver is on the order of a couple of watts whereas its normal operating power requirement may be on the order of one hundred watts. Because of the switched mode power supply's inefficiency at low power levels, as much as 10 to 12 watts may be consumed in the standby or off mode of the television receiver in order to supply its small standby power needs. The bulk of the power is dissipated as losses in the switched mode power supply. A few television receivers incorporate a separate standby power supply for supplying the minimal standby power requirements of the television receiver and simply turn off the switched mode power supply when the television receiver is turned off. That is a relatively expensive solution to the problem and the invention solves the problem in a much more practical manner.

OBJECTS OF THE INVENTION

A principal object of the invention is to provide an improved power supply for a television receiver.

Another object of the invention is to provide an efficient standby power system for a television receiver.

A further object of the invention to provide a method of efficiently operating a television receiver power supply that must supply relatively high operating power and low standby power.

BRIEF DESCRIPTION OF THE DRAWINGS

These and other objects and advantages of the invention will be apparent upon reading the following description in conjunction with the drawing, the single figure of which schematically depicts a television receiver power supply constructed in accordance with the invention.

DESCRIPTION OF THE PREFERRED EMBODIMENT

Referring to the single figure of the drawing, a television receiver is generally indicated by block 10. The television receiver includes a conventional fused connection to an AC power source, a bridge rectifier and a filter capacitor, all identified by reference 11, and a switched mode power supply (SMPS) 12 of conventional construction that drives a transformer 13. Transformer 13 includes a primary winding 14, three secondary windings 15, 17 and 19 for developing the various voltages required by the television receiver load and control circuits and an auxiliary winding 27 for supplying power to SMPS 12. A switch transistor 16 has its collector coupled through winding 14 to the source of B+ (from circuit 11) and its emitter connected to ground through a resistor 18. Winding 15 is used to supply power to the sweep circuit of the television receiver and the other secondary windings 17 and 19 supply lower voltage DC power to the other receiver circuits. As mentioned, auxiliary winding 27 supplies SMPS 12 with operating voltage via a rectifier and filter network 29. The secondary windings 15, 17 and 19 are connected to suitable diode and capacitor combinations for converting the AC voltage into DC. Thus winding 15 is coupled to a diode 20 which supplies a capacitor 23 for supplying the approximate 130 volt DC voltage required by the deflection system (not shown) of the television receiver. Winding 17 supplies a diode 21 and a capacitor 24 for supplying lower level DC voltage to the audio circuits of the receiver, also not shown, and winding 19 similarly supplies approximately 12 volt DC via diode 22 and capacitor 25 for control and other still lower voltage circuits. The latter circuits are coupled through transistors 26 and 28, respectively, which have their base control electrodes coupled to a transistor 30 that is activated by an on/off signal. This arrangement precludes energization of the low voltage B+ circuitry when the television receiver is turned off while the switched mode power supply is still activated to supply standby power. While the transistors 26, 28 and 30 are used in prior art television receivers, they continue to be used with the arrangement of the invention.

An opto coupler 32 of conventional construction supplies a switch transistor 34 for controlling the activation and deactivation of switched mode power supply 12. This is accomplished by means of a standby signal that is applied to opto coupler 32 through a resistor 36. The standby signal and the on/off signal are generated by a microprocessor 40 that is supplied with Vcc operating potential. The Vcc is taken from the output of a 5 volt regulator 42 that is supplied with DC voltage from the combination of secondary winding 19, diode 22 and capacitor 25. An energy storage capacitor 44 is coupled across the output of 5 volt regulator 42. The Vcc is also supplied to the IR remote control receiver in the television receiver.

In operation, under normal conditions when the television receiver is turned on, switch mode power supply 12 is energized from the auxiliary winding 27 and opto coupler 32. Transistor 34 is operated when the standby signal is high which results in conduction of the photo transistor. When transistor 34 conducts, switched mode power supply 12 is turned on and repetitively enables switch transistor 16 to develop an AC current in transformer 13. Transformed voltage is supplied by the secondary windings 15, 17, 19 and auxiliary winding 27, rectified and supplied to their respective circuits, including the 5 volt regulator 42 which supplies Vcc to capacitor 44 and to microprocessor 40. In the on condition of the television receiver, the standby signal assumes its off (high) state and the on/off signal is on. Therefore, transistors 26, 28 and 30 are operated and permit power flow to the appropriate circuitry in the television receiver.

When the television receiver is turned off, the on/off signal from microprocessor 40 goes to its off state and disables transistors 26 and 28 via transistor 30. The microprocessor also places the standby signal in its on (low) state which, via opto coupler 32, turns off switched mode supply 12. Thus there is no voltage developed across transformer 13. Microprocessor 40 now receives Vcc from energy storage capacitor 44 which, being on the output side of 5 volt regulator 42, is isolated from the circuits on the input side of the regulator. When the Vcc supplied to microprocessor 40 falls to a predetermined minimum, microprocessor 40 will turn off the standby signal (making the standby signal high) to enable activation of switched mode power supply 12 via opto coupler 32 and transistor 34, and once again, voltage will be developed across secondary windings 15, 17 and 19. The potential developed across winding 15 is ineffective to operate the television receiver deflection circuit because the necessary lower DC voltages from capacitors 24 and 25 are cut off by transistors 26 and 28 which remain nonconductive. The voltage developed across capacitor 25 however is taken before transistor 28 and supplied to the 5 volt regulator 42 to recharge capacitor 44. When capacitor 44 has been recharged, the reappearance of Vcc at the appropriate level causes microprocessor 40 to turn the standby signal back on and shut down switched mode power supply 12. Thus switched mode power supply 12 is periodically activated to replenish the energy of storage capacitor 44 and deactivated when the energy is replenished. All of the other circuits of the television receiver are deactivated so that the only power required while the switched mode power supply is on (when the television receiver is off) is that for replenishing energy storage capacitor 44. Consequently, the average power required by the television receiver in the standby mode is minimal and only slightly above the actual power used by the microprocessor 40 in its standby mode and by the IR receiver. The novel power supply is therefore cost effective, simple and energy efficient.

It is recognized that numerous changes in the description of the invention will be apparent to those skilled in the art without departing from its true spirit and scope. The invention is to be limited only as defined in the claims.

What is claimed is:

1. A method of providing standby power for a television receiver having a power supply that is inefficient when supplying small amounts of power, wherein a portion of said television receiver is supplied with operating power from said power supply that is electrically disconnected from said power supply when said television receiver is off, comprising the steps of:

disabling said power supply when said television receiver is turned off;

supplying said standby power to said television receiver from an energy storage source;

enabling said power supply to replenish said energy storage source when its energy level falls below a predetermined level;

disabling said power supply when the energy level of said energy storage source reaches said predetermined level; and replenishing said energy storage source from said power supply when its energy level falls below a predetermined level to return the energy level of said energy storage device to said predetermined level.

2. A method of supplying standby power to a television receiver having a switched mode power supply for supplying load circuits, said television receiver requiring said standby power when it is in the off condition, comprising the steps of:

providing energy from said switched mode power supply to an energy storage device;

disabling said switched mode power supply when said television receiver is in said off condition and supplying said standby power from said energy storage device; and periodically enabling said switched mode power supply to replenish said energy storage device while said television receiver is in said off condition.

3. The method of claim 2 wherein said television receiver includes a microprocessor control for controlling operation thereof and wherein said energy storage device comprises a capacitor coupled across the power input of said microprocessor control.

4. The method of claim 3 wherein said microprocessor control controls activation of said switched mode power supply to replenish said capacitor when the voltage on said capacitor reaches a minimum level and deactivation of said switched mode power supply when the voltage on said capacitor reaches a maximum level while said television receiver is in said off condition.

5. An energy efficient switched mode power supply system for a television receiver comprising:

a microprocessor for controlling operation of said switched mode power supply and of said television receiver;

a storage capacitor coupled between said microprocessor and said switched mode power supply for providing power for said microprocessor when said television receiver is off; and said microprocessor activating said switched mode power supply to charge said capacitor when the voltage thereon falls to a predetermined level while said television receiver is off.

6. The system of claim 5 further including a voltage regulator coupled between said capacitor and said switched mode power supply for regulating the voltage across said capacitor.

* * * * *